United States Patent
Kaida et al.

(10) Patent No.: US 6,979,413 B2
(45) Date of Patent: Dec. 27, 2005

(54) OPTICAL RECORDING MATERIAL

(75) Inventors: Yuriko Kaida, Yokohama (JP); Masahiro Irie, Fukuoka (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 10/787,375

(22) Filed: Feb. 27, 2004

(65) Prior Publication Data

US 2004/0166424 A1 Aug. 26, 2004

Related U.S. Application Data

(63) Continuation of application No. PCT/JP02/08610, filed on Aug. 27, 2002.

(30) Foreign Application Priority Data

Aug. 31, 2001 (JP) ........................................ 2001-263080

(51) Int. Cl.$^7$ ............................................. C09K 19/52
(52) U.S. Cl. .............................. 252/299.61; 430/270.14
(58) Field of Search .......................... 349/86, 96, 117, 349/119, 494, 500; 252/299.01; 430/270.11, 19–21, 945, 962

(56) References Cited

U.S. PATENT DOCUMENTS

| | | | | |
|---|---|---|---|---|
| 5,281,501 A | * | 1/1994 | Tatezono et al. | 430/21 |
| 5,529,864 A | * | 6/1996 | Tachibana et al. | 430/20 |
| 5,644,416 A | * | 7/1997 | Morikawa et al. | 349/86 |
| 6,133,390 A | * | 10/2000 | Kozlovski et al. | 526/287 |
| 6,512,085 B1 | * | 1/2003 | Minabe et al. | 528/480 |
| 6,650,615 B1 | * | 11/2003 | Yamamoto et al. | 369/275.1 |
| 6,787,621 B2 | * | 9/2004 | Kim et al. | 526/204 |

FOREIGN PATENT DOCUMENTS

| | | | | |
|---|---|---|---|---|
| EP | 0 864 885 A1 | 9/1998 | | |
| JP | 05-105730 | 4/1993 | | |
| JP | 05-232623 | * 9/1993 | ............. | C03C/1/73 |
| JP | 6-148608 | 5/1994 | | |
| JP | 7-36008 | 2/1995 | | |
| JP | 7-161039 | 6/1995 | | |
| JP | 08-069083 | * 3/1996 | ............. | C03C/1/73 |
| JP | 8-146391 | 6/1996 | | |
| JP | 9-77767 | 3/1997 | | |
| JP | 09-311356 | * 12/1997 | ............. | G02F/1/19 |
| JP | 11-30835 | 2/1999 | | |
| JP | 11256147 | 9/1999 | | |
| JP | 2001049244 | 2/2001 | | |

OTHER PUBLICATIONS

English translation of Yukio et al.*
English translation of Shinichi.*
English translation of Takeshi et al.*
C. Denekamp and B. L. Feringa, "Optically Active Diarylethenes for Multimode Photoswitching Between Liquid–Crystalline Phases", Advanced Materials, 10, No. 14, 1998, pp. 1080–1082.
M. Eichi and J.H. Wendorff, "Reversible Digital and Holographic Optical Storage in Polymeric Liquid Crystals", Macromol. Chem. Rapid Commun., 8, 1987, pp. 59–63.
Tsuyoshi Kawai, et al., "Refractive Index Change of Dithienylethene in Bulk Amorphous Solid Phase", Jpn. J. Appl. Phys., vol. 38, 1999, pp. L1194–L1196.

* cited by examiner

*Primary Examiner*—Mark F. Hutt
*Assistant Examiner*—Jennifer R. Sadula
(74) *Attorney, Agent, or Firm*—Oblon, Spivak, McClelland, Maier & Neustadt, P.C.

(57) ABSTRACT

Optical recording material which is capable of recording and reading an information signal by utilizing a change in the double refraction caused by a change in the molecular orientation of a side-chain type polymer liquid crystal which has an electrocyclic-reaction-type photochromic compound (or a residue thereof), or a side-chain polymer liquid crystal having in a polymer chain thereof a monomeric unit to which the photochromic compound is bonded.

9 Claims, 1 Drawing Sheet

Fig. 1

OPTICAL RECORDING MATERIAL

TECHNICAL FIELD

The present invention relates to a novel optical recording material for recording and reading an information signal by utilizing a change in double refraction, caused by a change in the molecular orientation of a side-chain type polymer liquid crystal containing a photochromic compound or a side-chain type polymer liquid crystal containing a photochromic compound residue in the monomeric unit thereof. Furthermore, the present invention relates to an optical recording medium having a recording layer comprising the optical recording material, and also relates to a recording method and/or a reading method which uses the optical recording material.

BACKGROUND ART

Trials have been made for recording an information signal by changing the orientation of a liquid crystal by use in combination of a liquid crystal material and a photochromic material. For example, there can be given a method of changing a cholesteric liquid crystal phase by mixing a chiral photochromic compound and a liquid crystal material and subjecting the mixture to photoisomerization (C. Denekamp and B. L. Feringa, Adv. Mater., 10, 1082, (1998)), and a method which uses a polymer liquid crystal material containing in the molecule thereof a photochromic compound, of which molecular orientation changes as cis-trans transition occurs under the irradiation with polarized light (M. Eichi and J. H. Wendorff, Macromol. Chem. Rapid Commun., 8, 59, (1987)). These methods, however, have problems with respect to thermal stability in recording, and durability in repeated use, and therefore have not yet been used in practice.

On the other hand, a photochromic diarylethene compound is such a photochromic material that is isomerized in a photon mode and has excellent repeated use durability, so that an optical recording medium using only this compound has been proposed (T. Kawai, et. al., Jpn. J. Appl. Phys., 38 1194, (1999)). However, this method requires exposure to a light with a wavelength range where the diarylethene compound absorbs the light at the time of recording and reading, and the light for use in reading is also used for erasing the record, so that this method has a problem that nondestructive read-out cannot be carried out.

The present invention has been made in order to solve the above-mentioned problem. An object of the present invention is to provide a novel optical recording material having excellent nondestructive read-out performance, repeated use durability and recording preservability, and also to provide an optical recording medium having a recording layer which uses this optical recording material. A further object of the present invention is to provide an optical recording method using this optical recording material, and to provide a method of non-destructively reading out a written record.

DISCLOSURE OF THE INVENTION

The inventors of the present invention, as a result of extensive studies, have discovered that recording and reading can be carried out by use of a side-chain type polymer liquid crystal containing a particular photochromic compound or a side-chain type polymer liquid crystal containing a particular photochromic compound residue in the monomeric unit thereof, as an optical recording material, when the polymer liquid crystal is subjected to uniaxial orientation processing, and irradiated with light at a temperature near the clearing point (Tc) thereof, thereby changing the molecular orientation of the liquid crystal, and causing a change in the double refraction of the optical recording material, and the change in the double refraction is used as an information signal for recording and reading. The present invention is the following optical recording material, optical recording medium, optical recording method, and recording and reading method:

An optical recording material comprising a side-chain type polymer liquid crystal which contains an electrocyclic-reaction-type photochromic compound.

An optical recording material comprising a side-chain type polymer liquid crystal having in a polymer chain thereof a monomeric unit to which an electrocyclic-reaction-type photochromic compound is bonded.

An optical recording body comprising the above-mentioned optical recording material which is subjected to uniaxial orientation processing.

An optical recording medium having a recording layer which comprises a thin layer of the above-mentioned optical recording material which is subjected to uniaxial orientation processing.

An optical recording method characterized by recording an information signal in an optical recording material by irradiating the thin layer (or the recording layer of the above-mentioned recording medium) of the above-mentioned optical recording material which is subjected to uniaxial orientation processing, with an information signal comprising a light with such a wavelength that changes the structure of a photochromic compound at a temperature near the clearing point (Tc) of the side-chain type polymer liquid crystal, thereby changing the molecular orientation of the side-chain type polymer liquid crystal.

A recording method characterized by reading out an information signal recorded in the optical recording material by the above-mentioned optical recording method, as a modulation of a polarized light of an incident light, for a change in the double refraction index caused by a change in the molecular orientation of the side-chain type polymer liquid crystal at a temperature below the glass transition temperature (Tg) of the side-chain type polymer liquid crystal.

A method of recording/reading out information characterized by recording information by irradiating a thin layer of the above-mentioned optical recording material which is subjected to uniaxial orientation processing with an information signal comprising a light with such a wavelength that changes the structure of a photochromic compound at a temperature near the clearing point (Tc) of a side-chain type polymer liquid crystal, and nondestructively reading out the recorded information by irradiating the thin layer with a light with an arbitrary wavelength (or the light with the wavelength used for recording) at a temperature blow the glass transition temperature (Tg) of the side-chain type polymer liquid crystal.

BRIEF DESCRIPTION OF THE DRAWINGS (FIG. 1) a cross-sectional view showing the structure of an optical recording medium of the present invention.
(Explanation of Reference Numerals)
1: Substrate
2: Orientation film
3: Recording layer
4: Reflective layer 5: Protective layer
10: Optical recording medium

BEST MODE FOR CARRYING OUT THE INVENTION

The optical recording material of the present invention comprises as essential components an electrocyclic-reaction-type photochromic compound (or a residue thereof) and a side-chain type polymer liquid crystal. The electrocyclic-reaction-type photochromic compound is such a photochromic compound that undergoes structural changes with the ring-closure/ring-opening of the molecule thereof by a photoreaction (refer to KIRK-OTHMER "ENCYCLOPEDIA OF CHEMICAL TECHNOLOGY", FOURTH EDITION, VOL.6. 328–330 (1993)). In particular, preferable is a photochromic compound with an isomer thereof on one side being capable of assuming two or more steric configurations in the isomerization which is caused by the electrocyclic reaction. As such a compound, for example, photochromic diarylethene compounds and photochromic fulgide compounds are known.

In the recording material of the present invention, the photochromic compound in the oriented side-chain type polymer liquid crystal undergoes changes in the molecular structure thereof due to a photoreaction, so that the orientation of liquid crystal portions in the vicinity of the molecule of the photochromic compound changes, and the orientation-changed portions remain as a record in the side-chain type polymer liquid crystal. By detecting the orientation-changed portions, the record can be read, and by causing the orientation-changed portions to disappear, the record can be erased.

When recording is conducted by changing the orientation of the liquid crystal (an information signal is written), it is preferable that the recording be conducted under the conditions in which the orientation of the side-chain type polymer liquid crystal can be easily changed, therefore, at a relatively high temperature in a liquid crystallinity exhibiting temperature range (from Tg to Tc) (that is, Tc or below, or at a temperature slightly higher than Tc: at a temperature near Tc). When the record is read (an information signal is read out), it is preferable that the reading be conducted under the conditions in which the orientation-changed portions are difficult to change again, therefore, at a temperature below Tg. When the record is erased, it is preferable that the changes in the orientation of the liquid crystal be caused to disappear by holding the recording material at a temperature of Tc or above for a certain period of time. Above Tc, the higher the temperature, the faster the erasing can be carried out.

It is a necessary condition for recording that the molecular structure of the photochromic compound change, but that change is not indispensable after the recording. For example, even if the molecular structure returns to the initial structure after the completion of the recording (for instance, in the case where a ring-opened structure is converted to a ring-closed structure at the time of recording, even if the ring-closed structure returns to the initial ring-opened structure at the time of reading out), the record can be maintained so long as the orientation of the liquid crystal does not change. Therefore, light with the same wavelength used at the time of recording can also be used at the time of reading.

When the recording material of the present invention is used, recording/reading can be respectively carried out at a different temperature condition, so that even if the wavelength of the light used at the time of recording and that of the light used at the time of reading are the same, the destruction of the record at the time of reading is little, and therefore the recording material of the present invention exhibits excellent non-destructive read-out performance, repeated use durability, and record preservation performance. The recording material of the present invention can also be used in the case where it is required to use light with the same wavelength for recording/reading, as in hologram recording.

As the electrocyclic-reaction-type photochromic compound for use in the present invention (hereinafter the compound is also referred to as the particular photochromic compound), it is particularly preferable to use an photochromic diarylethene compound. The present invention will now be explained using the photochromic diarylethene compound as an example.

The photochromic diarylethene compound (hereinafter the compound is also simply referred to as the diarylethene compound) may be dispersed or dissolved in a side-chain type polymer liquid crystal. The diarylethene compound may also be incorporated in the molecule of the side-chain type polymer liquid crystal as a monomeric unit to which the diarylethene compound is bonded. The diarylethene compound can be incorporated in the molecule of the side-chain type polymer liquid crystal by a method of copolymerizing a diarylethene compound having a polymerizable group and a polymerizable liquid crystal compound, and a method of bonding a diarylethene compound to a side-chain type polymer liquid crystal molecule having a bonding group.

Hereinafter, diarylethene compounds are collectively referred to as diarylethene compound (A). Of such diarylethene compounds, a diarylethene compound having a polymerizable group, which can be incorporated into the molecule of the side-chain type polymer liquid crystal by copolymerization, is referred to as diarylethene compound (A-1). A diarylethene compound which can be bonded to the molecule of a side-chain type polymer liquid crystal having a bonding group is referred to as diarylethene compound (A-2). Diarylethene compound (A-1) and diarylethene compound (A-2) can also be used by being dispersed or dissolved in the side-chain type polymer liquid crystal.

Side-chain type polymer liquid crystal is a polymer exhibiting liquid crystallinity, which has such a structure that a mesogenic skeleton exhibiting liquid crystallinity is bonded to a main chain through a particular spacer. This polymer can be obtained by polymerizing a compound exhibiting liquid crystallinity in which a polymerizable group is bonded to a mesogenic skeleton through a particular spacer (hereinafter referred to as liquid crystal monomer). The side-chain type polymer liquid crystal may be a copolymer prepared from two or more liquid crystal monomers, or from a liquid crystal monomer and other monomer (which does not exhibits liquid crystallinity), provided that it is necessary that the mixture of the liquid crystal monomer and the other monomer exhibit liquid crystallinity. As the other monomer, there can be given the above-mentioned diarylethene compound (A-1) and a monomer for introducing a bonding group. Hereinafter, the side-chain type polymer liquid crystal is simply referred to as polymer liquid crystal as well.

As the liquid crystal monomer, there are compounds having either a polymerizable unsaturated group which serves as a polymerizable group and can undergo addition polymerization, a cyclic ether group (such as epoxy group) or cyclic ester group which can undergo ring-opening addition polymerization, or a bifunctional silyl group. The liquid crystal monomer may be a condensation polymerization type monomer such as a combination of a dicarboxylic acid compound capable of forming a polyester chain and a diol type compound. Therefore, as the main chain of the polymer liquid crystal, in addition to polyethylene chain formed by the polymerization of a polymerizable unsaturated group, there can be given, for example, polyoxyalkylene chain, polyester chain, and polysiloxane chain.

Examples of the mesogenic skeleton in the polymer liquid crystal include biphenyl type skeleton, phenyl benzoate type skeleton, cyclohexylbenzene type skeleton, azoxybenene type skeleton, azomethine type skeleton, phenylpyrimidine type skeleton, biphenylbenzoate type skeleton, cyclohexyl-biphenyl type skeleton, and terphenyl type skeleton. The liquid crystal monomers are compounds which are prepared by bonding such a skeleton to a polymerizable group through a particular spacer.

Examples of the monomeric units of the liquid crystal monomer in the polymer liquid crystal are such monomeric units that are represented by the formulae (2) to (5) shown below. In the formulae, $R^{13}$ represents a hydrogen atom, or a monovalent hydrocarbon group having 10 or less carbon atoms. m is an integer of from 1 to 20. r is an integer of from 1 to 10. $\Phi^1$, $\Phi^2$, Y, Z, $R^{11}$ and $R^{12}$ will be explained later. In the following formulae, it is preferable that $R^{13}$ be a hydrogen atom or an alkyl group having 4 or less carbon atoms, m be an integer of from 2 to 6, and r be an inter of from 1 to 8.

In the present invention, as the liquid crystal monomer for producing the polymer liquid crystal, it is preferable to employ a liquid crystal monomer represented by the following formula (6) which provides the monomeric unit represented by the above formula (2). This liquid crystal monomer is an acrylate or methacrylate having a mesogenic skeleton (hereinafter, the acrylate and methacrylate are collectively referred to as (meth)acrylate). As the polymer liquid crystal, it is preferable to employ a polymer having one or more kinds of the (meth)acrylate units represented by the formula (6):

In the formula (6), $R^{11}$ represents a hydrogen atom or a methyl group, $R^{12}$ represents a hydrogen atom, an alkyl group, an alkoxy group, a carboxyl group, a chloroalkyl group, a fluoroalkoxy group, a cyano group, or a halogen atom, Y and Z each independently represent a single bond, —O—, —COO—, —OCO—, —CH=N—, —N=CH— or —C≡C—. $\Phi^1$ and $\Phi^2$ each independently represent any of the following bivalent groups. n is an integer of from 0 to 30. In the following, the bivalent group indicated by a hexagon with an inner H represents a trans 1,4-cyclohexylene group. Q represents a fluorine atom, a chlorine atom or a bromine atom. j is an integer of from 0 to 4.

In the liquid crystal monomer represented by the formula (6), it is preferable that $R^{11}$ be a hydrogen atom, that Y be a single bond, —O—, —COO—, or —OCO—, and that n be an integer of from 0 to 10. When $R^{12}$ is an alkyl group, an alkoxy group, a chloroalkyl group, or a fluoroalkoxy group, it is preferable that the number of carbon atoms thereof be 20 or less, more preferably, 10 or less. Furthermore, it is preferable that these groups be of a straight chain. Preferable examples of $R^{12}$ are a straight-chain alkyl group having 10 or less carbon atoms, a cyano group, a fluorine atom or a chlorine atom.

It is preferable that the other liquid crystal monomer be an addition polymerizable compound which is formed by bonding a group having a polymerizable unsaturated group such as a vinylphenyl group, a vinyloxy group, an allyloxy group or other groups containing $CH_2$=CH—, and the above-mentioned -$\Phi^1$-Z-$\Phi^2$-$R_{12}$ through a linking group.

The liquid crystal monomer, when polymerized in the same manner as in the case of conventional monomers, provides a polymer liquid crystal. The polymerization method is not limited to a particular polymerization method. For example, the liquid crystal monomer represented by the above formula (6) can be polymerized by radical polymerization. In particular, preferable are a polymerization method which is carried out by use of a radical generator under the application of heat, and a polymerization method which is carried out by use of a photopolymerization initiator under the irradiation of ultraviolet light.

The monomer for introducing the bonding group into the polymer liquid crystal may not necessarily be the liquid crystal monomer, but may be a monomer which is copolymerizable with the above-mentioned liquid crystal monomer. An example of the monomer which is copolymerizable with the above-mentioned liquid crystal monomer represented by the formula (6) is a bonding-group-containing (meth)acrylate. Specific examples thereof are hydroxy-alkyl (meth)acrylate, epoxy-substituted alkyl (meth)acrylate, aminoalkyl(meth)acrylate, and isocyanate alkyl(meth) acrylate. Likewise, in the polymer liquid crystals having a monomeric unit represented by any of the above-mentioned formulae from (3) to (5), a bonding group can be introduced into the polymer liquid crystals by copolymerizing the copolymerizable monomer having the bonding group and the liquid crystal monomer.

Although there is no particular limitation on the ratio of the monomeric unit having the bonding group in the polymer liquid crystal having the bonding group as long as the polymer exhibits liquid crystallinity, it is preferable that the ratio to the total of the monomers be from 0.1 to 50 mol %, more preferably from 1 to 20 mol %.

The diarylethene compound (A) for use in the present invention is an electrocyclic-reaction-type photochromic diarylethene compound. This is a compound having an aryl group on each of the opposite sides of an ethenylene group (>C=C<). Each carbon atom (at position β) adjacent to the carbon atom (at position α) of each aryl group which is bonded to the ethenylene group is mutually bonded by the action of light (to form a ring containing the ethenylene group), whereby the compound exhibits photochromic properties. It is preferable that a group other than hydrogen atom (for example, a cyano group or an alkyl group) be bonded to each of the other two bonding hands of the ethenylene group. More particularly, it is preferable that a bivalent bond be bonded to each of the two bonding hands to form a ring containing the ethenylene group therein. As the bivalent group, there is a bivalent group formed by eliminating the ethenylene group from a ring L which will be mentioned later. For example, an alkylene group, a halogen-containing alkylene group and an oxaalkylene group, each having from 1 to 5 carbon atoms, are preferable as such bivalent group. A particularly preferable bivalent group is a polyfluoroalkylene group. A perfluoroalkylene group having from 3 to 4 carbon atoms is preferable.

Preferable examples of the aryl group in the diarylethene compound (A) are indol-3-yl group, thiophen-3-yl group, and benzo[b]thiophen-3-yl group. It is preferable that these aryl groups have a substituent. In particular, it is preferable that there exist a substituent such as an alkyl group or an alkoxy group at the carbon group at position 2 (the carbon atom at the above-mentioned position β). In the above-mentioned diarylethene compound (A-1) and diarylethene compound (A-2), the presence of a substituent containing a polymerizable group or a bonding group is essential. These substituents are bonded to positions other than the position 2 of the above-mentioned aryl group. In the above-mentioned aryl group of the diarylethene compound (A), various substituents other than the above-mentioned substituents can be caused to exist.

The two aryl groups in the diarylethene compound (A) may be the same or different. However, in order to facilitate both the ring closure by the irradiation of light at a relatively high temperature (a temperature near Tc of the polymer liquid crystal) and the change of the orientation of the liquid crystal, it is preferable that the diarylethene compound (A) have an unsymmetrical molecular structure, so that it is preferable that the two aryl groups be different. In particular, it is preferable that one aryl group be an indol-3-yl group, and the other be a thiophen-3-yl group or a benzo[b] thiophen-3-yl group.

A particularly preferable diarylethene compound (A) for use in the present invention is a compound represented by the following formula (1):

X in the formula (1) represents the above formula (a) or formula (b), provided that $R^1$, $R^4$, and $R^6$ each independently represent an alkyl group which may have a substituent, or an alkoxy group which may have a substituent, $R^2$ represents a hydrogen atom, an alkyl group which may have a substituent, an alkoxy group which may have a substituent, or an organic group containing a monovalent polymerizable unsaturated group, $R^3$ and $R^5$ each independently represent a hydrogen atom, a cyano group, a nitro group, an alkyl group which may have a substituent, an alkoxy group which may have a substituent, a monovalent aromatic ring which may have a substituent, or an organic group containing a monovalent polymerizable unsaturated group, $R^7$ represents a monovalent aromatic ring group which may have a substituent, $R^8$ represents a hydrogen atom, an alkyl group which may have a substituent, or an alkoxy group which may have a substituent, and Ring L represents a carbon ring or a heterocyclic ring.

It is preferable that $R^1$, $R^4$, and $R^6$ each independently be an alkyl group or alkoxy group having 10 or less carbon atoms, which may have a substituent, for example, a halogen atom such as a fluorine atom or a chlorine atom, a hydroxyl group, an amino group, or a carboxyl group. More specifically, an alkyl group or haloalkyl group having 4 or less carbon atoms, and an alkoxy group or haloalkoxy group having 4 or less carbon atoms are preferable. An alkyl group or alkoxy group having 1 or 2 carbon atoms is most preferable. Within one molecule, $R^1$ and $R^4$ (or $R^6$) may be different. However, it is preferable that $R^1$ and $R^4$ (or $R^6$) be the same within one molecule.

$R^2$ represents a hydrogen atom, an alkyl group which may have a substituent, an alkoxy group which may have a substituent, or an organic group containing a monovalent polymerizable unsaturated group. It is preferable that the alkyl group and the alkoxy group have 20 or less carbon atoms. As the substituent thereof, a halogen atom such as a fluorine atom and a chlorine atom, a hydroxyl group, an amino group, a carboxyl group, and an epoxy group are preferable. In particular, an alkyl group, a haloalkyl group, a hydroxyalkyl group, an alkoxy group, and a hydroxyalkoxy group, each having 10 or less carbon atoms, are preferable. The organic group containing a monovalent polymerizable unsaturated group will be explained later.

$R^3$ and $R^5$ each independently represent a hydrogen atom, a cyano group, a nitro group, an alkyl group, an alkoxy group, a monovalent aromatic ring, or an organic group containing a monovalent polymerizable unsaturated group. The alkyl group, the alkoxy group, and the monovalent aromatic ring group may have a substituent. It is preferable that the alkyl group and the alkoxy group have carbon atoms of 20 or less (particularly 10 or less). As the substituent thereof, a halogen atom such as a fluorine atom and a chlorine atom, a hydroxyl group, an amino group, a carboxyl group and an epoxy group are preferable. As the monovalent aromatic ring group, the same monovalent aromatic ring group as represented by $R^7$ as shown below is preferable. The organic group containing a monovalent polymerizable unsaturated group will be explained later.

$R^7$ represents a monovalent aromatic ring group which may have a substituent. In the present invention, the aromatic ring group means an aromatic ring group and an aromatic heterocyclic ring. Examples of the aromatic ring include a benzene ring and a naphthalene ring. Examples of the aromatic heterocyclic ring include a thiophene ring, a benzo[b]thiophene ring, a pyrrole ring, a furan ring, a pyridine ring, and an indole ring. To these rings, there may be bonded an alkyl group, a haloalkyl group, an alkoxy group, an alkenyl group, a cyano group, a nitro group, a halogen atom, a hydroxyl group, an amino group, a carboxyl group, an epoxy group, and other substituents. It is preferable that the number of carbon atoms of these substituents be 4 or less.

It is preferable that $R^8$ be a hydrogen atom, or an alkyl group or alkoxy group having 10 or less carbon atoms. These groups may have a substituent, for example, a halogen atom such as a fluorine atom and a chlorine atom, a hydroxyl group, an amino group, a carboxyl group, and an epoxy group. It is more preferable that $R^8$ be a hydrogen atom, an alkyl group, haloalkyl group, or hydroxyalkyl group, each having 4 or less carbon atoms, or an alkoxy group or haloalkoxy group having 4 or less carbon atoms.

Ring L represents a carbon ring or a heterocyclic ring. It is preferable that the number of the atoms which constitute the ring containing the ethenylene ring be from 3 to 8, more preferably 5 or 6. It is preferable that the atom other than the carbon atom in the heterocyclic ring be an oxygen atom or a nitrogen atom, and the number of the atoms be from 1 to 2. To the carbon ring or the heterocyclic ring, a substituent other than a hydrogen atom may be bonded. In the case where the substituent is, for example, a halogen atom, the substituent may be substituted for all of the hydrogen atoms. A preferable Ring L is a 5- or 6-membered carbon ring such as a pentene ring or a hexane ring. It is preferable that a halogen atom such as a fluorine atom and a chlorine atom (particularly a fluorine atom) be bonded to the ring. A particularly preferable Ring L is a perfluoropentene ring. In the chemical formulas shown below, the ring moiety with an inner F indicates a perfluoro ring.

Of the diarylethene compounds (A), it is preferable that the diarylethene compound (A-1) be a diarylethene compound represented by the above-mentioned formula (1), which has an organic group containing one or more monovalent polymerizable unsaturated groups, more preferably one monovalent polymerizable unsaturated group. It is particularly preferable that in $R^2$, $R^3$ and $R^5$ in the diarylethene compound represented by the formula (1), $R^2$ be the organic group containing a monovalent polymerizable unsaturated group. It is also preferable that the polymerizable unsaturated group be the unsaturated group in (meth)acryloyloxy group. Furthermore, a polymerizable unsaturated group represented by CH$_2$=CH— as in a vinylphenyl group, a vinyloxy group, and an allyloxy group is preferable. The organic group containing the monovalent polymerizable unsaturated group may be either a group itself, which contains a polymerizable unsaturated group represented by CH$_2$=CH—, or a vinyl group.

It is preferable that the organic group containing the monovalent polymerizable unsaturated group be such an organic group that includes a spacer which links, for example, a (meth)acryloyloxy group or a vinylphenyl group and a nitrogen atom or a carbon atom of the diarylethene compound. Preferable spacers are, for example, an alkylene group, an oxyalkylene group, and a polyoxyalkylene group. It is preferable that the number of carbon atoms of these spacers be 20 or less, more preferably 10 or less.

Preferable organic groups containing the monovalent polymerizable unsaturated group are the groups represented by the following formula (7) or formula (8), and a 4-vinylphenyl group, provided that in the formula (7) and the formula (8), $R^{11}$ represents a hydrogen atom or a methyl group, $R^{21}$ represents an alkylene group which may have a substituent, $R^{22}$ represents a single bond or an alkylene group, p is an integer of from 1 to 20, and q is an integer of from 1 to 10. It is preferable that $R^{21}$ be an ethylene group, a propylene group, or a tetramethylene group, that $R^{22}$ in the formula (7) be a single bond, that $R^{22}$ in the formula (8) be an alkylene group having from 2 to 8 carbon atoms, that p be an integer of from 2 to 10, and that q be an integer of from 1 to 4.

Copolymerization of the diarylethene compound (A-1) having the polymerizable unsaturated group and the liquid crystal monomer provides a polymer liquid crystal having monomeric units of the diary ethene compound (A-1). A method of the polymerization is not particularly limited. For example, the liquid crystal monomer represented by the above-mentioned formula (6) and a diarylethene compound (A-1) having a (meth)acryloyloxy group can be copolymerized in the presence of a radical generator with the application of heat thereto. Furthermore, these can be copolymerized in the presence of a photopolymerization initiator, for instance, under the irradiation of ultraviolet light. As the photopolymerization initiator, there can be employed a photoradical initiator in general use, a representative example of which is a benzoin type photoradical initiator such as Irgacure 369 (trade name).

A polymer liquid crystal having the monomeric unit of the diarylethene compound (A-1) can also be likewise obtained by use of a diarylethene compound (A-1) having other polymerizable group. For example, there can be obtained from a diarylethene compound (A-1) having an epoxy group a polymer liquid crystal having the monomeric unit of the diarylethene compound (A-1) and the liquid crystal monomeric unit represented by the above-mentioned formula (3). There can be obtained from a diarylethene compound (A-1) having two hydroxyl groups or two carboxy groups a polymer liquid crystal having the monomeric unit of the diarylethene compound (A-1) and the liquid crystal monomeric unit represented by the above-mentioned formula (4). There can be obtained from a diarylethene compound (A-1) having a bifunctional silyl group such as an alkyldialkoxy silyl group or an alkyldichloro silyl group a polymer liquid crystal having the monomeric unit of the diarylethene compound (A-1) and the liquid crystal monomeric unit represented by the above-mentioned formula (5).

There is no particular limitation on the ratio of the monomeric units of the diarylethene compound (A-1) in the polymer liquid crystal having the monomeric units of the diarylethene compound (A-1) as long as the polymer exhibits liquid crystallinity. However, it is preferable that the ratio thereof to all the monomer units be from 0.1 to 50 mol %. The ratio of from 1 to 20 mol % is particularly preferable. When this ratio is less than 0.1 mol %, the optical recording performance is apt to become insufficient, while when the ratio exceeds 50 mol %, there is a risk that the liquid crystallinity thereof is considerably lowered. Even when other particular copolymerizable photochromic compounds are employed, it is preferable that the monomeric units of the diarylethene compound (A-1) be contained in this ratio.

Of the diarylethene compounds (A), the diarylethene compound (A-2) is a diarylethene compound having a functional group which can be bonded to a polymer liquid crystal having a bonding group through the bonding group. For example, for a polymer liquid crystal having a hydroxyl group, there can be employed a diarylethene compound having a functional group capable of forming an ester bond such as a carboxyl group and a haloformyl group, an epoxy group, or an isocyanate group. In contrast to this, for a polymer liquid crystal having such a functional group as bonding group, there can be employed a diarylethene compound having a hydroxyl group (for example, the above-mentioned $R^2$ is a hydroxylalkyl group).

The bonding ratio of the diarylethene compound (A-2) to the polymer liquid crystal having a bonding group thereto depends on the above-mentioned ratio of the monomeric units having the bonding group in the polymer liquid crystal having a bonding group, and normally not more than the above-mentioned ratio (provided that there may be a case where the monomeric unit has two or more binding groups). It is unnecessary to have the diarylethene compound (A-2) bonded to all the bonding groups. There is no particular limitation on the ratio of the monomeric units to which the diarylethene compound (A-2) has been bonded to all the monomeric units of the polymer liquid crystal as long as the polymer exhibits liquid crystallinity. However, it is preferable that the ratio of the monomeric units to all the monomeric units be from 0.1 to 50 mol %. The ratio of from 1 to 20 mol % is particularly preferable. When this ratio is less than 0.1 mol %, the optical recording performance is apt to become insufficient, while when the ratio exceeds 50 mol %, there is a risk that the liquid crystallinity thereof is considerably lowered. When other particular bonding photochromic compounds are employed, it is preferable that the diarylethene compound (A-2) be contained in this ratio.

The present invention is also an optical recording material comprising a side-chain type polymer liquid crystal which contains therein a particular photochromic compound such as the diarylethene compound (A). A material in which the diarylethene compound (A) is dispersed or dissolved in the polymer liquid crystal, without being bonded to the polymer liquid crystal also functions as the optical recording material. The diarylethene compound (A) may be one that does not have a polymerizable group or a functional group. Diarylethene compounds having a polymerizable group or a functional group (the above-mentioned (A-1) and (A-2)) can also be used. Two or more polymer liquid crystals can be used in combination.

An optical recording material comprising a polymer liquid crystal containing therein the diarylethene compound (A) can be produced by a method of removing a solvent from a solution of the polymer liquid crystal and the diarylethene compound (A). Furthermore, the optical recording material comprising a polymer liquid crystal containing therein the diarylethene compound (A) can also be produced likewise by polymerizing a mixture of a liquid crystal monomer and a non-copolymerizable diaryl ethene compound (A). It is preferable that the polymerization be photopolymerization.

It is preferable that the content of the diarylethene compound (A) in this optical recording material be from 0.1 to 50 mass % with respect to the total of the diarylethene compound (A) and the polymer liquid crystal. The content of from 1 to 20 mass % is particularly preferable. When this ratio is less than 0.1 mass %, the optical recording performance is apt to become insufficient, while when the ratio exceeds 50 mass %, there is a risk that the liquid crystallinity of the polymer liquid crystal is considerably hindered. When other particular photochromic compounds are employed, it is preferable the diarylethene compound (A) be contained in this ratio.

It is preferable that the polymer liquid crystal for use in the present invention have a number average molecular weight of from 1000 to 1,000,000, particularly more preferably a number average molecular weight of 10,000 to 100,000, whether or not a particular photochromic compound is bonded to the polymer liquid crystal. When the molecular weight is too low, the physical properties of the material become insufficient so that it is difficult to obtain a film with good durability, while when the molecular weight is too high, a problem is apt to be caused in the workability of the material, for instance, when forming a film of the material.

Additives such as a stabilizer may be added to the optical recording material of the present invention. Examples of such a stabilizer include antioxidants such as hindered phenol type antioxidants, and light stabilizers such as hindered amine light stabilizers and benzotriazole light stabilizers. It is preferable that the content of these additives in the optical recording material be 5 mass % or less.

The lower limit of the temperature of the optical recording material of the present invention, which shows the liquid crystallinity thereof, is indicated by the glass transition temperature (Tg) thereof, while the upper limit thereof is indicated by the clearing point (Tc) thereof. It is preferable that Tg of the optical recording material of the present invention be above 30° C., and 50° C. or above is particularly preferable. When Tg is too low, the film cannot maintain its shape, so that, for example, a problem is apt to occur that the durability of a recording layer is lowered. Furthermore, it is preferable that Tc be 70° C. or above, more preferably 100° C. or above, most preferably 120° C. or above. When Tc is too low, the oriented state of the liquid crystal cannot be maintained, so that, for example, a problem is apt to occur that the recording preservability is lowered. There is no particular limitation on the upper limit of Tc. However, when Tc is excessively high, the resultant temperature at the time of recording becomes excessively high, so that there is a risk that the handling of the recording material at the time of recording becomes difficult. Therefore, it is preferable that Tc be 300° C. or below, and 250° C. or below is particularly preferable.

It is preferable that the optical recording material of the present invention, when used, be uniaxially oriented. The present invention is an optical recording body comprising the above-mentioned uniaxially oriented, optical recording material. It is preferable that the recording body be in the shape of a thin film. The recording body can be used for various purposes for optical recording. In particular, the optical recording body is suitable for use as an optical recording layer in an optical recording medium. Therefore, the optical recording material of the present invention is suitable for the material for the recording layer in the optical recording medium. Therefore, the present invention is an optical recording medium having a recording layer which comprises the above-mentioned uniaxially oriented, optical recording material.

The uniaxial orientation of the optical recording material of the present invention can be carried out by conventionally known methods. For example, a uniaxially oriented thin film of the optical recording material can be formed by a method of annealing the optical recording material in a temperature range (the temperature range of from Tg to Tc) in which the optical recording material exhibits liquid crystallinity, in contact with an orientation film which is subjected to a uniaxial orientation processing, or by a method of heating the optical recording material to the temperature of Tc, followed by gradual cooling of the optical recording material. The orientation film can be formed by use of a conventionally known material such as polyimide or polyvinyl alcohol (PVA). This film can be used by subjecting the film to, for example, rubbing processing to uniaxially orient the film.

Furthermore, a thin film of a uniaxially oriented optical recording material can be formed by polymerizing a raw material for the optical recording material, such as the above-mentioned liquid crystal monomer, in an oriented state (for example, in contact with a uniaxially oriented orientation film), thereby forming an optical recording material. For example, a mixture of the monomer represented by the above-mentioned formula (6) used as the liquid crystal monomer and the diarylethene compound (A-1) represented by the above-mentioned formula (1), which has a (meth) acryloyloxy group, is polymerized while in contact with the orientation film, whereby a thin film of a uniaxially oriented optical recording material can be formed. In particular, it is preferable to form the desired thin film by photopolymerizing a mixture of two monomers, each having an acryloyloxy group, in a cell held between the orientation films.

Furthermore, a thin film of a uniaxially oriented optical recording material can be formed without using such an orientation film. The orientation can be achieved with the application of an external force thereto, for example, by use of a method of subjecting the optical recording material to drawing processing, or a method of subjecting the optical recording material to injection molding.

There is no particular limit on the thickness of the thin film of the uniaxially oriented optical recording material. However, it is preferable that the thickness be from 0.1 to 500 $\mu$m, and from 1 to 100 $\mu$m is particularly preferable.

Figure 1:
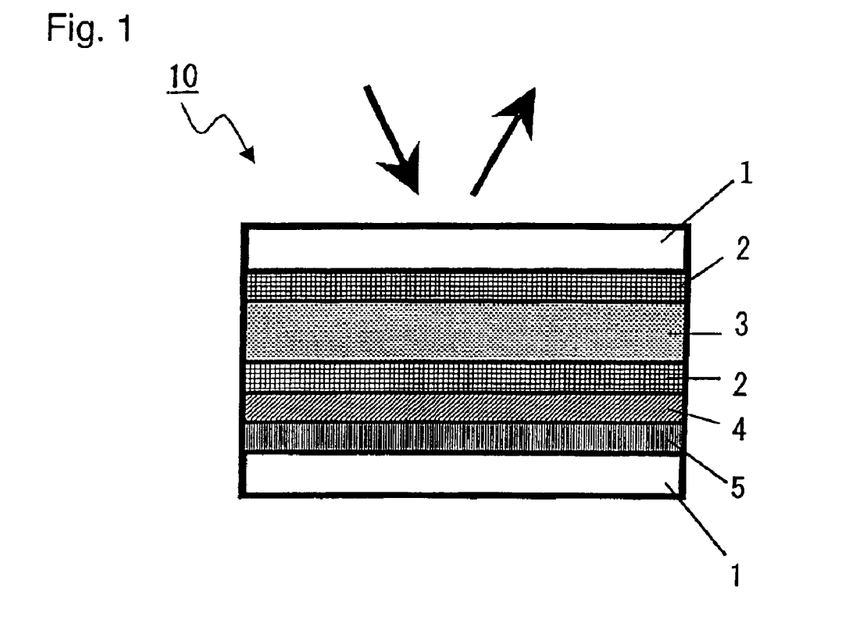

The structure of the optical recording medium of the present invention and a method of fabricating the optical recording medium will now be explained. It is preferable that the optical recording medium have such a structure that a thin film of the uniaxially oriented optical recording material serving as a recording layer is held between at least two substrates. An orientation film may be provided between the thin film of the optical recording material and the substrate, and a light reflective layer may also be provided on one of the substrates. Furthermore, there may be provided a reflection preventing film for preventing the reflection by the uppermost surface thereof, and an interference film for improving the efficiency of an entering laser beam. As the materials that can be used for the substrate, there can be given polycarbonate, polymethylmethacrylate, and synthetic resins such as amorphous olefin type resins. The substrate can be formed by subjecting any of these resins to injection molding, and when necessary, guide grooves for tracking, and pits such as address pits can be formed on the surface thereof. A substrate made of an inorganic material such as glass can also be used. FIG. 1 is a cross-sectional view of an example of an optical recording medium of the present invention. In the FIGURE, reference numeral 10 indicates the optical recording medium; reference numeral 1, a substrate; reference numeral 2, an orientation film; reference numeral 3, a recording layer comprising a thin film which comprises a uniaxially oriented optical recording material; reference numeral 4, a reflective layer; and reference numeral 5, a protective layer.

A method of fabricating a representative optical recording medium will now be explained. To begin with, an orientation film is formed by coating a solution containing an oriented film material on a substrate by a spin coating method, a bar coat method, or a doctor blade method, followed by drying the coated solution. The orientation film is then subjected to rubbing processing by rubbing the same in one direction with a cloth or a sheet of paper. The optical recording material is then dissolved in an appropriate solvent or melted with the application of heat thereto, and then coated on the above-mentioned orientation film, whereby a thin film with a predetermined thickness is formed. On this thin film is superimposed the other substrate with an orientation film thereon, and an optical recording medium is fabricated by contact bonding under reduced pressure or with the application of heat thereto. When fabricating the optical recording medium, it is also preferable to obtain an accurate film thickness by use of a spacer made of glass or a synthetic resin. Finally, the liquid crystal is caused to be uniaxially oriented by annealing the liquid crystal at a predetermined temperature, and gradually cooling the same. In addition to the above, there is another method of injecting polymerizable raw materials for the optical recording material (raw materials including a liquid crystal monomer and a particular photochromic compound) into between two substrates, each provided with an orientation film which is oriented (for instance, into a cell constructed of the two substrates), to uniaxially orient the liquid crystal monomer, and photopolymerizing the polymerizable raw materials in a state where the liquid crystal monomer is oriented. In this case, the particular photochromic compound contained in the polymerizable raw materials may be either copolymerizable or non-copolymerizable. By this photopolymerization, there can be formed between the substrates a recording layer which comprises a thin film of the optical recording material of the present invention.

A method of performing optical recording and reading by use of the above-mentioned optical recording medium will now be explained. The optical recording (writing of an information signal by light) is carried out by irradiating the particular photochromic compound with an information signal comprising a light with a wavelength which is capable of changing the conformation of the photochromic compound in a temperature range near Tc of the optical recording material, thereby causing photoexcitation in a particular photochromic compound component (the particular photochromic compound or a residue of the photochromic compound), changing the orientation in the irradiated portion of the liquid crystal, and recording as the information signal a difference Δn in the orientation between the irradiated portion and a non-irradiated portion of the liquid crystal. The wavelength of the light for the irradiation may be, for example, in a wavelength range in which a ring-opened diarylethene component and a ring-closed diarylethene component absorb the light. The reading (reading the information signal by light) is carried out by the modulation of linearly polarized light. More specifically, the reading is carried out by causing linearly polarized light with an arbitrary wavelength to pass through the optical recording material or to be reflected by the optical recording material, and then modulating the intensity of the light which passes an analyzer (detecting the difference in the intensity of the light). Erasing (erasing of the recorded information signal) is carried out by heating the optical recording material to a temperature of Tc or above.

In holographic recording, reading is carried out by the modulation of linearly polarized light by use of the light with the same wavelength as that of the light used in recording. More specifically, recording is carried out by causing linearly polarized light with an identical wavelength to pass through the optical recording material or to reflect therefrom, and detecting the modulation of the intensity of the light.

A method of performing nondestructive reading of the present invention will now be explained. In the case where the optical recording medium is of a transmission type, an information (spot) recorded in the optical recording material can be read out by being placed between two polarizing plates (one is a polarizer, and the other is an analyzer) with the plane of polarization thereof being positioned in a crossed (crossed Nicols) or parallel (parallel Nicols) arrangement. In this case, good reading can be practically carried out by setting the orientation direction of the polymer liquid crystal with respect to the plane of polarization of the polarizer, preferably in an angle range of from 30° to 60°, more preferably at an angle of 45°. When a polarized laser is employed as the light source for reading, reading can be done only by use of an analyzer. Also in this case, good reading can be practically carried out by setting the orientation direction of the polymer liquid crystal with respect to the plane of polarization of the polarizer, preferably in an angle range of from 30° to 60°, more preferably at an angle of 45°. In the case where the optical recording medium is of a reflection type, reading may be carried out in the same manner as in the case of the transmission type except that both the polarizer and the analyzer are arranged on one side of a cell surface so as to make the plane of polarization thereof crossed or parallel.

As mentioned above, the recording of an information signal in the optical recording material is carried out by irradiation with the light having the information signal at a temperature near the clearing point (Tc) of the polymer liquid crystal (provided that the temperature is Tg or above). It is preferable that the temperature at the time of the recording (writing) be (Tc−30° C.) or above and less than (Tc+10° C.), and from (Tc−15° C.) to Tc is particularly preferable. Furthermore, it is preferable that the recorded information signal be read out at a temperature less than Tg of the polymer liquid crystal. The temperature at the time of reading is usually the temperature of the atmosphere in which the recording medium is used, normally at from 0 to 30° C. Therefore, it is preferable that Tg be higher than this temperature. As mentioned above, it is preferable that Tg of the polymer be above 30° C., and 50° C. or above is particularly preferable.

Furthermore, the recorded information signal can be erased by maintaining the recording medium at a temperature at Tc of the polymer liquid crystal or above. Above Tc, the higher the temperature, the shorter the erasing time. It is preferable that the erasing temperature be (Tc+10° C.) or above. When there is a risk that the recording medium or the like is maintained in the atmosphere at relatively high temperatures, it is preferable that a polymer liquid with high Tc be employed in order to prevent the record from being erased.

The optical recording medium of the present invention can be applied to various recording methods, more specifically, for example, hologram recording, multi-layer recording and near-field recording.

EXAMPLES

The present invention will now be specifically explained with reference to the following Examples. However, the present invention will not be limited to the following Examples.

SYNTHESES EXAMPLE 1

Synthesis of Polymer Liquid Crystal

In an ampoule with the atmosphere therein replaced with nitrogen, liquid crystal monomers represented by the following formulae from (6-1) to (6-3), dimethylformamide (DMF) and azobisisobutyronitrile (AIBN) were placed in such mass ratios as shown in Table 1, and polymerized at 60° C. for 12 hours, whereby a polymer liquid crystal was synthesized. The obtained solution was poured into methanol and the polymer liquid crystal was precipitated, whereby the polymer liquid crystal was purified. The number average molecular weight of this polymer liquid crystal was about 30,000, and a liquid crystalline phase exhibiting temperature range (from Tg to Tc) was from 35° C. to 78° C. This polymer liquid crystal is referred to as PL1. In the following formulae, Ph represents a 1,4-phenylene group (hereinafter the same).

CH$_2$=CHCOO—Ph—Ph—CN  (6-1)

CH$_2$=CHCOO(CH$_2$)$_3$—O—Ph—Ph—CN  (6-2)

CH$_2$=CHCOO(CH$_2$)$_6$—O—Ph—Ph—CN  (6-3)

SYNTHESIS EXAMPLE 2

Synthesis of Polymer Liquid Crystal

In an ampoule with the atmosphere therein replaced with nitrogen, the liquid crystal monomers represented by the formulae from (6-1) to (6-3), the following diarylethene monomer (1-1), DMF and AIBN were placed in such mass ratios as shown in Table 1, and a polymer liquid crystal with the monomeric units of the diarylethene monomer (1-1) included in the polymer chain thereof was obtained in the same manner as in Synthesis Example 1. The number average molecular weight of this polymer liquid crystal was about 30,000, and a liquid crystalline phase exhibiting temperature range was from 35° C. to 73° C. This polymer liquid crystal is referred to as PL2.

Diarylethene monomer (1-1): Compound of the formula (1) in which X is (a), R$^1$ is a methyl group, R$^2$ is a 2-acryloyloxyethyl group, R$^3$ is a hydrogen atom, R$^4$ is a methyl group, R$^5$ is a hydrogen atom, and Ring L is a perfluorocyclopentene ring.

Diarylethene (1-2), which will be described later, is a compound having the same structure as mentioned above except that R$^2$ is a 2-hydroxyethyl group.

(1-1)

(1-2)

| | Composition for Preparation | | | | | | Yield of Polymer (%) |
|---|---|---|---|---|---|---|---|
| | (6-1) (g) | (6-2) (g) | (6-3) (g) | (1-1) (g) | AIBN (g) | DMF (g) | |
| Synthesis Example 1 | 0.4 | 0.4 | 0.4 | — | 0.01 | 1.5 | 97.3 |
| Synthesis Example 2 | 0.4 | 0.4 | 0.4 | 0.11 | 0.01 | 1.5 | 95.4 |

EXAMPLE 1

PL1 was used as polymer liquid crystal. A cell was fabricated as follows. An 8 mass % PVA aqueous solution was coated by a spin coating method on one side of each of two glass substrates and dried. The surface of the coated layer was then subjected to rubbing processing, using cotton, whereby an orientation film was formed. On the orientation film formed on one of the glass substrates, there was coated by a bar coater a solution of 9 parts by mass of diarylethene (1-2) represented by the above-mentioned formula (1-2) and 91 parts by mass of polymer liquid crystal PL1 in tetrahydrofuran (40 mass % in terms of solute concentration). After the coated solution was dried, 10 μm resin spacers were scattered thereon. The other glass substrate was superimposed on the polymer liquid crystal in such a manner that the orientation film of the other glass substrate came into contact with the polymer liquid crystal and that the orientation of the orientation film was directed in an anti-parallel direction to the lower glass plate, and contact bonding was carried out at a temperature raised up to 80° C. The cell thus formed by contact bonding was then uniaxially orientated by subjecting the same to anneal processing at 70° C. for 30 minutes.

The thus fabricated cell was transparent and exhibited excellent orientation. An observation by use of a polarizing microscope indicates that a dark state and a light state appeared repeatedly at every rotation angle of 45° under a crossed Nicols. Writing was carried out by use of ultraviolet light. A sample covered with a photomask was irradiated with ultraviolet light (λ=365 nm, 3.4 mW/cm$^2$) for 1 minute, followed by irradiation with white light at 25° C., so that the coloring of a ultraviolet radiated portion was decolorized. An of the irradiated portion and the non-irradiated portion was measured by an automatic double refraction meter. The result was 0.02. The erasing of the record was achieved by elevating the temperature to 80° C. or above. However, the record was not erased even though the entire surface of the sample was irradiated with ultraviolet light (λ=365 nm, 3.4 mW/cm$^2$), which was the same light as that used for recording, at 25° C. for 1 minute (the value of Δn of the irradiated portion and the non-irradiated portion was invariable).

The operation of irradiation with white light at 25° C. after writing by the irradiation with ultraviolet light is an operation for returning the ring-closed diarylethene (1-2) in the ultraviolet irradiated portion to the original ring-opened diarylethene (1-2) since there is a risk that a problem may occur in the measurement as the ring-opened diarylethene (1-2) is converted to the ring-closed diarylethene (which is colored) by the irradiation with ultraviolet light in the ultraviolet irradiated portion and colored (which coloring is essential for recording). This decolorizing operation is not an essential operation for recording and reading. This indicates that the structural changes in the diarylethene at room temperature has no effects on the preservation of the record.

EXAMPLE 2

A cell was fabricated by use of PL2 as polymer liquid crystal in the same manner as in Example 1 except that diarylethene (1-2) was not used. After contact bonding, the cell was gradually cooled from 80° C. to 35° C. at a rate of 1° C./min, whereby uniaxial orientation was conducted. In the same manner as in Example 1, writing was conducted by the irradiation with ultraviolet light at 70° C., followed by the irradiation with white light at 25° C. Δn of the ultraviolet light irradiated portion and the non-irradiated portion was measured by an automatic double refraction meter. The result was 0.02.

EXAMPLE 3

A liquid crystal monomer mixture was prepared by mixing the compounds (6-1), (6-2) and (6-3), as used in Synthesis Example 1, each in an equal amount. This liquid crystal monomer mixture was a nematic liquid crystal at room temperature, with Tc thereof being 49° C.

On one side of each of two glass plates, a solution of a polyimide of an orientation film material was coated. The coated layer was subjected to thermal processing and dried to form an orientation film. The surface of the orientation film was then subjected to rubbing processing in a predetermined direction, using a nylon cloth, thereby prepared supports. The two supports were superimposed on each other in such a manner that the surface of each orientation film came into contact with each other and bonded to each other by use of an adhesive agent, whereby a cell was fabricated. When preparing the cell, glass beads were mixed with the adhesive agent so that the space in the cell was adjusted to 13 μm. To 100 parts by mass of the above-mentioned liquid crystal monomer mixture were added 9.9 parts by mass of diarylethene (1-2), and 0.5 parts by mass of Irgacure 369 (made by Ciba-Geigy Corp), whereby a photopolymerizable liquid crystal composition was prepared. This photopolymerizable liquid crystal composition was injected into the cell at 65° C.

Photopolymerization was then conducted by the irradiation with ultraviolet light with an intensity of 10 mW/cm$^2$ at 30° C. for 60 seconds. After the polymerization, the cell was heated to 60° C. for 1 hour in an oven. Then the polymer liquid crystal in the cell was irradiated with white light at 25° C. for 10 minutes. The irradiation with white light was an operation for returning the diarylethene (1-2) to a ring-opened diarylethene since part of the diarylethene (1-2) became a ring-closed diarylethene by the ultraviolet light used in the photopolymerization and the polymer liquid crystal was colored.

In the same manner as in Example 1, writing was made in the polymer liquid crystal in the cell by the irradiation with ultraviolet light at 70° C. After irradiating with white light at 25° C., the liquid crystal was inspected under crossed Nicols. Δn of the ultraviolet light irradiated portion and the non-irradiated portion was 0.04. When heated to 80° C. or above, the record was erased.

The polymer liquid crystal detached from the cell was a solid in the form of a film and horizontally oriented in the rubbing direction. By use of GPC (GPC-8010, made by Tosoh Corp.), the number average molecular weight of the polymer liquid crystal was measured. The result was that the number average molecular weight of the polymer liquid crystal was 100,000, and a liquid crystalline phase exhibiting temperature range was from 35 to 78° C.

EXAMPLE 4

A cell charged with a polymer liquid crystal was fabricated in the same manner as in Example 3 except that 9.9 parts by mass of diarylethene (1-1) per 100 parts of the liquid crystal monomer mixture used in Example 3 were used instead of the above-mentioned diarylethene (1-2). The number average molecular weight of this polymer liquid crystal was 100,000, and a liquid crystalline phase exhibiting temperature range was from 35 to 78° C.

After irradiating the polymer liquid crystal in the cell with white light at 25° C., writing was conducted in the same manner as in Example 1 by irradiating the polymer liquid crystal with ultraviolet light at 75° C. After irradiating with white light at 25° C., the liquid crystal was inspected under crossed Nicols. Δn of the ultraviolet light irradiated portion and the non-irradiated portion was 0.03. When heated to 80° C. or above, the record was erased.

EXAMPLE 5

A cell charged with a polymer liquid crystal was fabricated in the same manner as in Example 3 by using the liquid crystalline monomer (6-3), the following (6-4) and the following (6-5), each in an equal amount, and further using 9.9 parts by mass of diarylethene monomer (1-1) per 100 parts by mass of this liquid crystal monomer mixture. The number average molecular weight of this polymer liquid crystal was 100,000, and a liquid crystalline phase exhibiting temperature range was from 43 to 128° C.

After irradiating the polymer liquid crystal within the cell with white light at 25° C. for 10 minutes, writing was conducted in the same manner as in Example 1 by irradiating the polymer liquid crystal with ultraviolet light at 125° C. Furthermore, after irradiating with white light at 25° C., the liquid crystal was inspected under crossed Nicols. Δn of the ultraviolet light irradiated portion and the non-irradiated portion was 0.05. When heated to 140° C. or above, the record was erased.

CH$_2$=CHCOO—Ph—OCO—Ph—(n-C$_4$H$_9$)  (6-4)

CH$_2$=CHCOO—Ph—OCO—Ph—(n-C$_5$H$_{11}$)  (6-5)

EXAMPLE 6

A cell charged with a polymer liquid crystal was fabricated in the same manner as in Example 3 by using the above-mentioned liquid crystalline monomers (6-2), (6-4) and (6-5), each in an equal amount, and further using 9.9 parts by mass of diarylethene monomer (1-1) per 100 parts by mass of this liquid crystal monomer mixture. The number average molecular weight of this polymer liquid crystal was 100,000, and a liquid crystalline phase exhibiting temperature range was from 55 to 212° C.

After irradiating the polymer liquid crystal within the cell with white light for 10 minutes, writing was conducted in the same manner as in Example 1 by irradiating the polymer liquid crystal with ultraviolet light at 209° C. Furthermore, after irradiating with white light at room temperature, the liquid crystal was inspected under crossed Nicols. An of the light irradiated portion and the non-irradiated portion was 0.02. When heated to 220° C. or above, the record was erased.

Industrial Applicability

The optical recording material of the present invention is capable of performing light modulation, when irradiated with light near Tc thereof, so that it can be applied to photo operator devices, optical memories, and the like. Furthermore, when the optical recording material of the present invention is employed as an optical recording medium, the optical recording medium exhibits excellent nondestructive read-out performance, and excellent thermal memory stability. Therefore, the optical recording medium of the present invention and the recording and reading method of the present invention are useful as being applicable to optical disk, optical memory card, and the like.

The entire disclosure of Japanese Patent Application No. 2001-263080 filed on Aug. 31, 2001 including specification, claims, drawings and summary is incorporated herein by reference in its entirety.

What is claimed is:

1. An optical recording material comprising a side-chain polymer liquid crystal which contains a photochromic diarylethene compound (A), or a side-chain type polymer liquid crystal having a polymer chain, said polymer chain containing therein a monomeric unit to which an electrocyclic-reaction-type photochromic compound is bonded, wherein said monomeric unit is a polymerized photochromic diarylethene compound (A-1) having a polymerizable group, wherein said photochromic diarylethene compound (A) and said photochromic diarylethene compound (A-1) are a compound represented by the following formula (1), provided that said photochromic diarylethene compound (A-1) has a polymerizable unsaturated group, wherein X in the formula (1) represents the above formula (a) or formula (b), provided that R$^1$, R$^4$, and R$^6$ each independently represent an alkyl group which may have a substituent, or an alkoxy group which may have a substituent, R$^2$ represents a hydrogen atom, an alkyl group which may have a substituent, an alkoxy group which may have a substituent, or an organic group containing a monovalent polymerizable unsaturated group, R$^3$ and R$^5$ each independently represent a hydrogen atom, a cyano group, a nitro group, an alkyl group which may have a substituent, an alkoxy group which may have a substituent, a monovalent aromatic ring which may have a substituent, or an organic group containing a monovalent polymerizable unsaturated group, R$^7$ represents a monovalent aromatic ring group which may have a substituent, R$^8$ represents a hydrogen atom, an alkyl group which may have a substituent, or an alkoxy group which may have a substituent, and ring L represents a carbon ring or a heterocyclic ring.

2. An optical recording body comprising said optical recording medium as defined in claim 1, which is subjected to uniaxial orientation processing.

3. An optical recording medium comprising a recording layer which comprises a thin layer of said optical recording material as defined in claim 1, which is subjected to uniaxial orientation processing.

4. An optical recording method characterized in that an information signal is recorded on an optical recording material by irradiating said recording layer of said optical recording medium as defined in claim 3, with an information signal which comprises a light with a wavelength which is capable of changing the structure of a photochromic compound at a temperature near a clearing point (Tc) of a side-chain type polymer liquid crystal, thereby changing the molecular orientation of said side-chain type polymer liquid crystal.

5. An optical recording method characterized in that an information signal is recorded on an optical recording material by irradiating a thin film of said optical recording material as defined in claim 1, which is subjected to uniaxial orientation processing, with an information signal which comprises a light with a wavelength which is capable of changing the structure of a photochromic compound at a temperature near a clearing point (Tc) of a side-chain type polymer liquid crystal, thereby changing the molecular orientation of said side-chain type polymer liquid crystal.

6. A reading method for reading an information signal recorded on an optical recording material by said optical recording method as defined in claim 5 by reading out as a modulation of polarized light of an incident light a change in the double refraction caused by a change in the molecular orientation in a side-chain type polymer liquid crystal at a temperature less than a glass transition temperature (Tg) of said side-chain type polymer liquid crystal.

7. A method of recording/reading information characterized by irradiating a thin layer of said optical recording material as defined in claim 1, which is subjected to uniaxial orientation processing, with an information signal which comprises a light with a wavelength which is capable of changing the structure of a photochromic compound at a temperature near a clearing point (Tc) of a side-chain type polymer liquid crystal, thereby recording information and nondestructively reading out the information recorded by irradiating light with an arbitrary wavelength at a temperature less than a glass transition temperature (Tg) of said side-chain type polymer liquid crystal.

8. The method of recording/reading according to claim 7, wherein the clearing point (Tc) of said side-chain type polymer liquid crystal is 70° C. or above, and the glass transition temperature (Tg) of said side-chain type polymer liquid crystal is 50° C. or less.

9. A method of recording/reading information characterized by irradiating a thin layer of said optical recording material as defined in claim 1, which is subjected to uniaxial orientation processing, with an information signal which comprises a light with a wavelength which is capable of changing the structure of a photochromic compound at a temperature near a clearing point (Tc) of a side-chain type polymer liquid crystal, thereby recording information, and nondestructively reading out said recorded information by irradiating with light with the wavelength used in said recording at a temperature less than a glass transition temperature (Tg) of said side-chain type polymer liquid crystal.

* * * * *